United States Patent [19]

Inbar et al.

[11] Patent Number: 5,790,216
[45] Date of Patent: Aug. 4, 1998

[54] VIEWING APPARATUS AND WORK STATION

[75] Inventors: Dan Inbar; Hanan Wolf, both of Haifa, Israel

[73] Assignee: Smartlight Ltd., Nesher, Israel

[21] Appl. No.: 648,008

[22] PCT Filed: Nov. 28, 1994

[86] PCT No.: PCT/EP94/03971

§ 371 Date: May 24, 1996

§ 102(e) Date: May 24, 1996

[87] PCT Pub. No.: WO95/14950

PCT Pub. Date: Jun. 1, 1995

[30] Foreign Application Priority Data

| Nov. 28, 1993 | [IL] | Israel | 107782 |
| Dec. 15, 1993 | [IL] | Israel | 108037 |
| Dec. 15, 1993 | [IL] | Israel | 108038 |

[51] Int. Cl.⁶ .......................... G02F 1/1347; G02B 27/02
[52] U.S. Cl. .......................... 349/83; 40/361; 40/362
[58] Field of Search .......................... 349/83, 61; 40/361, 40/362, 363

[56] References Cited

U.S. PATENT DOCUMENTS

| 1,988,654 | 1/1935 | Haag | 40/361 |
| 2,436,162 | 2/1948 | Cadenas | 40/361 |
| 2,516,270 | 7/1950 | Swain | 40/132 |

(List continued on next page.)

FOREIGN PATENT DOCUMENTS

| 0035382 | 9/1981 | European Pat. Off. |
| 0165548 | 12/1985 | European Pat. Off. |
| 0253379 | 1/1988 | European Pat. Off. |
| 0352101 | 1/1990 | European Pat. Off. |
| 0412757 | 2/1991 | European Pat. Off. |
| 0436267 | 7/1991 | European Pat. Off. |
| 2559923 | 8/1985 | France . |
| 1961126 | 7/1970 | Germany . |
| 3331762 | 3/1985 | Germany . |
| 9010889 | 1/1991 | Germany . |
| 3933988 | 4/1991 | Germany . |
| 64-84141 | 3/1989 | Japan . |
| 2050032 | 12/1980 | United Kingdom . |
| 2062930 | 5/1981 | United Kingdom . |
| 8903064 | 4/1989 | WIPO . |
| 9006537 | 6/1990 | WIPO . |
| 9110152 | 7/1991 | WIPO . |
| 9301564 | 1/1993 | WIPO . |

OTHER PUBLICATIONS

D.P. Carmody et al., "Global and Segmented Search for Lung Nodules of Different Edge Gradients", Investigative Radiology, May–Jun. 1980, vol. 15, No. 3, pp. 224–233.

Werner E. Haas, *Liquid Crystal Display Research*: The First Fifteen Years, vol. Cryst. and Liq. Crys, vol. 94, pp. 1–31 (1983).

(List continued on next page.)

*Primary Examiner*—William L. Sikes
*Assistant Examiner*—Toan Ton
*Attorney, Agent, or Firm*—Greenblum & Bernstein P.L.C.

[57] ABSTRACT

Viewing apparatus including a transparency viewing apparatus (18, 19) and an electronic data display (58) unit mounted, preferably side-by-side in a housing.

24 Claims, 8 Drawing Sheets

U.S. PATENT DOCUMENTS

| | | | |
|---|---|---|---|
| 2,754,605 | 7/1956 | Berkeley | 40/31 |
| 3,246,412 | 4/1966 | Sommerhoff | 40/361 |
| 3,322,485 | 5/1967 | Williams | 349/143 |
| 3,492,486 | 1/1970 | Bischoff et al. | 40/106.1 |
| 3,714,413 | 1/1973 | Craig | 240/9.3 |
| 4,004,360 | 1/1977 | Hammond | 40/106.1 |
| 4,118,654 | 10/1978 | Ohta et al. | 40/361 |
| 4,335,936 | 6/1982 | Nonomura et al. | 349/82 |
| 4,368,467 | 1/1983 | Unotoro et al. | 340/799 |
| 4,373,280 | 2/1983 | Armfield, III | 40/367 |
| 4,378,557 | 3/1983 | Murata | 345/94 |
| 4,403,832 | 9/1983 | Tanaka et al. | 349/83 |
| 4,448,490 | 5/1984 | Shibuya et al. | 349/82 |
| 4,454,904 | 6/1984 | Oxman | 160/332 |
| 4,510,708 | 4/1985 | Pokrinchak | 40/361 |
| 4,637,150 | 1/1987 | Geluk | 40/361 |
| 4,707,080 | 11/1987 | Fergason | 349/89 |
| 4,775,918 | 10/1988 | Snyder | 362/18 |
| 4,799,083 | 1/1989 | Knodt | 355/14 R |
| 4,833,542 | 5/1989 | Hara et al. | 358/230 |
| 4,850,675 | 7/1989 | Hatanaka et al. | 349/2 |
| 4,855,725 | 8/1989 | Fernandez | 340/706 |
| 4,859,037 | 8/1989 | Iwashita et al. | 349/97 |
| 4,901,155 | 2/1990 | Hara et al. | 358/230 |
| 4,908,876 | 3/1990 | DeForest et al. | 382/34 |
| 4,917,465 | 4/1990 | Conner et al. | 349/5 |
| 4,952,036 | 8/1990 | Gulick et al. | 349/82 |
| 4,966,441 | 10/1990 | Conner | 349/80 |
| 4,977,315 | 12/1990 | Purcell | 250/221 |
| 4,983,956 | 1/1991 | Salam | 345/109 |
| 5,124,818 | 6/1992 | Conner et al. | 349/75 |
| 5,155,608 | 10/1992 | Hatano | 349/76 |
| 5,159,363 | 10/1992 | Brauning | 353/122 |
| 5,313,726 | 5/1994 | Yaniv et al. | 40/361 |
| 5,430,964 | 7/1995 | Inbar et al. | 40/361 |
| 5,491,332 | 2/1996 | Inbar et al. | 250/221 |

OTHER PUBLICATIONS

*Liquid Crystals, Nature's Delicate Phase of Matter*, by Peter J. Collings, Princenton University Press, 1990, Chapter 2, pp. 24–34.

Stephen Balter, et al., *Radiographic Viewing Conditions*, published in the conference proceedings of "Application of Optical Instrumentation in Medicine, 2nd Seminar," SPIE, 29–30 Nov. 1973 pp. 225–227.

J. Blair Hartley, *Film Viewing* 1996, (Ro–B1 20, Yr. Feb., 1967), pages 96 and 97.

Gerd Rosenbusch, *Radiology in Medical Diagnostics*, 1994, p. 465.

*Physiologishe Problems der Betrachtung des Rontgenbildes* (Psychological Problems in Viewing Radiograph) by Rainer Rohler, dated Feb. 1967, pp. 79 and 86–96 and English translation titled "Physiological Problems of Reading of Radiographs" (Ro–B1, 20 Yr Feb. 1967).

Patent Abstracts of Japan, vol. 10, No. 206 (P–478).

Patent Abstracts of Japan, vol. 17, No. 387 (P–1576).

Patent Abstracts of Japan, vol. 16, No. 562 (P–1456).

J. Nehring, IEEE Transactions of Electron Devices, vol. 26, No. 5, May 1979, New York, US, pp. 795–802, "Ultimate Limits for Matrix Addressing . . .".

T.N. Ruckmongathan, Conference Record of the 1988 International Display Research Conference, Oct. 1988, pp. 80–85, "A Generalized Addressing Technique for RMS Responding Matrix LCD".

H. Hamada, SID 1992, pp. 269–272, "Brightness Enhancement of an LCD Projector by a Plana Mcrolens Array".

IBM Technical Disclosure Bulletin, vol. 33, No. 9 Feb. 1991, New York, US, pp. 261–262, "High Efficiency Backlight for LCD".

Patent Abstract of Japan, vol. 13, No. 314 (P899).

Patent Abstract of Japan, vol. 17, No. 464 (P1599).

Jameson et al., "Visual Psychophysics", pp. VII, VIII, 43–49,54 and 78–101, 1972.

E. Kaneko, "Liquid Crystal TV Displays: Principles and Applications of Liquid Crystal Displays", pp. 77–137.

T.N. Ruckmongathan et al., Japan Display 1992, "S3–4 New Addressing Technique for Fast Responding STN LCDs", pp. 65–68.

K. Tarumi et al. Japan Display 1992, "S15–5 On the Relationship between the Material Parameters and the Switching Dynamics in Twisted Nematic Liquid Crystals", pp. 587–590.

P.M. Alt et al., IEEE "Transactions on Electron Devices" vol. ED–21, Feb. 1974, pp. 146–155.

FIG. 2A
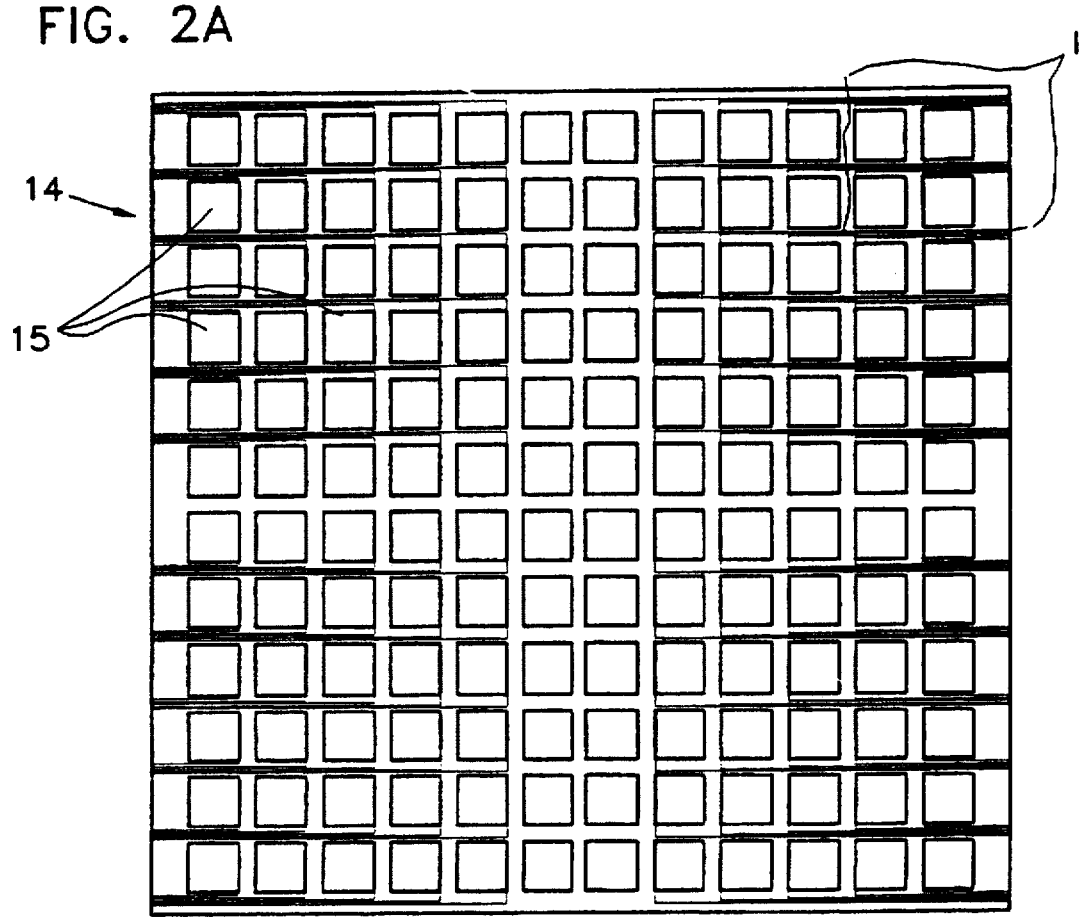
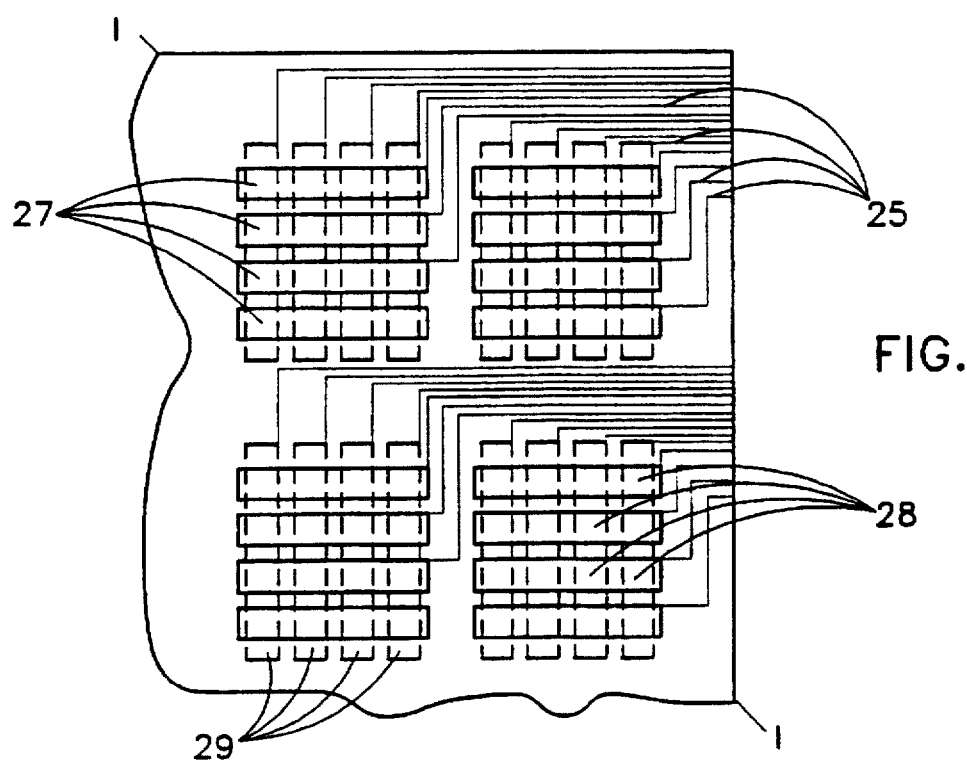
FIG. 2B

VIEWING APPARATUS AND WORK STATION

RELATED APPLICATION

This application is the U.S. National filing of PCT/EP94/03968, which was filed on Nov. 28, 1994.

FIELD OF THE INVENTION

The present invention relates to viewing apparatus in general and, more particularly, to medical viewing and display apparatus including a light-modulated viewing device for X-ray film.

BACKGROUND OF THE INVENTION

Transparencies such as medical X-ray transparencies are usually examined by placing them over the viewing surface of a device commonly known as an illuminator. Conventional illuminators normally comprise a box-like structure enclosing fluorescent lighting tubes behind a light-diffusing plate which defines the viewing area. Commonly, transparencies are attached to the viewing surface by pushing the upper edge of the transparencies under spring-loaded film-holder clips located along the top edge of the viewing surface.

Standard size illuminators have a viewing surface seventeen inches high and fourteen inches or multiples of fourteen inches (i.e., 28 or 56 inches) wide. Usually, each fourteen inch width of viewing surface has its own fluorescent tubes and control switch. Such a viewing surface enables the viewing of standard size X-ray films which measure up to seventeen inches by fourteen inches.

It is well known that, when the viewed transparencies do not completely cover the viewing surface, undesired glare is generated from areas of the viewing surface not covered by the transparencies. This commonly occurs when transparencies smaller than fourteen inches by seventeen inches are to be examined while being typically retained on the display area in the same manner as full size transparencies as described above. Furthermore, even if the viewing area is fully covered with transparencies, slight dislocation of the transparencies on the viewing surface usually results in glaring light streaks at the edges of the transparencies. In practice, annoying glare is almost constantly generated from the viewing surface since viewing surfaces are typically quite large (thus, they are seldom completely covered) and since viewing surfaces (typically illuminated by slow-starting fluorescent light) are normally continuously lit while transparencies are changed.

Often, transparencies contain very transparent regions and very dense regions, which may be adjacent to each other and, frequently, the transparencies examined by radiologists are overexposed or underexposed or both. In these cases, considerable glare (and therefore deviation in adaptation levels) emanates through areas of the transparencies themselves.

The glare from uncovered areas detracts from the visual perception of the person "reading" the transparencies and assess the information contained thereon. Specifically, the ability of the eye to discern between close gray levels is reduced when the light adaption level based on the surroundings is different from the light level of the detail. This phenomenon was noted by E. W. Weber who found that "the minimum perceptible difference in illumination stimulus is proportional to the level of the light stimulus". This can be stated in terms of vision by: $\delta L/L = K$ (K is a constant designated the Weber constant); wherein L is the adaptation level luminance and $\delta L$ is the minimum detectable difference in luminance. See, for example, "Elemente der Psychophysic", G. T. Fechner, Leipzig, 1860, and "Visual Psychophysics", D. Jameson and L. M. Hurvich (ed.), Berlin, 1972.

Attempts have been made in the past to provide viewing devices for X-ray transparencies which shield the eyes of the observer from light emanating from light sources other than the light passing through the transparencies, in order to obscure light in parts of the transparencies and to reduce the contrast in transparencies when so required.

Flat panel spatial light modulators such as liquid crystal devices (LCD) are well known. Such devices are used extensively for visual display in applications such as car dashboards, instrumentation panels, household devices, sign posts, etc. Liquid crystal arrays (LCA) are used for displays such as computer display monitors, TV monitors and projection devices.

WO 91/10152 describes using an LCA in an improved transparency viewing apparatus. According to application '152, selective masking of the transparency viewing area is performed by a controlled LCA. In one mode of operation, the LCA allows passage of light only through transparency covered regions of the viewing surface while blocking the light in the remaining viewing area. In another mode of operation, the LCA allows passage of light only through a portion of the viewed transparency, defined by the observer, which is referred to as a region of interest (ROI).

WO 93/01564 describes a display device which includes a mapping function. In a preferred embodiment of that invention, a liquid crystal array, which is used for masking portions of a viewing area, is also used as a transparency detecting and scanning device responsive to light transmission in the viewing area. The mapping function provides convenient control of the display area and, particularly, is useful for defining the extent of the transparency as proposed by application '152 described above.

In preferred embodiments of the view boxes described in the '152 and '564 applications employing a LCA, the light transmission of individual elements in the array is automatically adjusted such that the average light transmission through different portions of the viewing area, including portions outside the transparencies, are similar. This reduces the overall contrast of the viewed area and, therefore, provides grounds for a more nearly optimum visual adaptation level resulting in a better contrast detail discernibility of the transparencies. However, if the elements in the LCA are too small, the visual information on the transparency, perceived as differences in light transmission between adjacent loci on the transparency, may be lost. Thus, in order to avoid loss of detail, preferred dimensions for the individual LCD elements are at least 2 mm by 2 mm each.

For many other applications such as, for example, computer screens, in which the LCA is utilized to create an image, "fine" LCAs must be used. Such arrays, having very small individually addressed elements, are used in order to create informative detail, in contrast to the "coarse" arrays described above which are concerned with improved contrast discernibility, without losing detail.

Generally speaking, there are two basic approaches to designing LCAs having individually addressed LCD elements. According to a first approach, each LCD element in the array is directly addressed by a separate, exclusive pair of electrodes and electronic driving elements (typically a MOS logic transistor). It is appreciated that the number of driving elements and conductors required by this approach is equal to the number of LCD elements in the array, e.g. n×m drivers and conductors are needed for driving an n×m LCA.

Such an arrangement, commonly referred to as "direct addressing", is very complicated and expensive to construct when a "fine" array is desired. Furthermore, an exclusive set of conductors must be used for connecting each driving element to its directly driven LCD element. Therefore, in "fine" directly addressed arrays, a substantial area of the LCA is inevitably occupied by addressing conductors, thereby substantially limiting the area covered by active LCD elements. The "overhead" of area uncovered by active elements limits the contrast of spatially modulated light generated by the LCDs.

According to a second approach, all of the elements of each row and each column of the LCA are directly addressed by an individual driving element, with the individual LCD elements in each row and in each column connected in series. Thus, only n+m drivers and n+m sets of addressing conductors are needed in order to drive an n×m LCA. In order to address a given element in the array, the row and the column defining its location must be simultaneously addressed.

Since the number of combinations in addressing the matrix is $2^{(n+m)}$ and the number of different array arrangements is $2^{(n+m)}$, it is appreciated that many array arrangements cannot be produced by a static addressing combination. In fact, only array arrangements consisting of one or more rectangular regions which are all addressed by the same set of rows, or the same set of columns, can be achieved by continuously applying one addressing combination. Since only n+m electrodes and drivers are available, multiple addressing combinations are applied periodically, thereby reducing the contrast in the addressed region. In spite of the reduced contrast, this addressing technique, commonly referred to as "matrix addressing", is often preferred for high resolution LCAs because it does not suffer from the limitations of direct addressed LCAs.

In existing X-ray transparency viewing apparatus, the entire viewing area is used exclusively for viewing transparencies. Thus, any additional information needed by a reader during a viewing session, such as information regarding the patient or information related to the viewed transparencies, or images generated by electronic imaging devices such as CT or nuclear medicine images, must be obtained from information sources which are not associated with the viewing area. The inconvenient use of such separate sources, for example a computer, poses an undue burden on the limited attention of the viewer.

Various imaging modalities are known in the art such as, for example, conventional X-Ray, CT or NMR scanners, Gamma cameras and ultrasound imaging devices. Occasionally, more than one of these imaging apparatus are used in the same clinical case in order to provide a more comprehensive diagnosis of the patient's condition. In such cases, several processing units and display devices are used simultaneously by the viewer. This requires time consuming dividing of the attention of the physician to the various devices, which are physically separated. Furthermore, such arrangement is uneconomical both space-wise and cost-wise.

SUMMARY OF THE INVENTION

The present inventors have confronted the seemingly inevitable conflict, described above, between trying to improve contrast and providing a high resolution liquid crystal (LC) array (LCA). This relationship between contrast and resolution is lamentable, since the use of high resolution LCAs can provide various improvements to existing transparency viewing apparatus. It is, therefore, an object of the present invention to provide an LCA combining advantages of both a "coarse" (i.e. low resolution, high contrast) LCA and a "fine" (i.e. high resolution) LCA.

It is a further object of the present invention to combine, in single work station, an X-ray transparency viewer and other display means having the same or different resolution.

In accordance with a first aspect of the present invention, there is thus provided an LCA including a plurality of LC elements. The LC elements are grouped in sub-arrays, wherein each sub-array is addressed separately from the other sub-arrays. In a preferred embodiment, each sub-array can be operated in either a low-resolution, high-contrast, mode, in which the LC elements in the sub-array are addressed collectively, or in a high-resolution mode, in which the individual elements in the sub-array are addressed separately using "matrix addressing".

Further, in accordance with this first aspect of the invention, a viewing apparatus, including a backlight source, is provided with an LCA, as described in the previous paragraph, overlying the backlight source. The viewing apparatus is preferably further provided with a viewing surface on which X-ray transparencies to be viewed are mounted.

In a preferred embodiment of this aspect of the invention, the LCA is located behind the viewing surface, i.e. between the backlight source and the viewing surface, and each sub-array of the LCA is associated with a corresponding elemental portion on the viewing surface. In accordance with a preferred embodiment of this aspect of the invention, when only part of the viewing surface is covered by transparencies, the boundaries of the regions covered by the transparencies are detected by the apparatus as described in WO 91/10152, the disclosure of which is incorporated herein by reference. When such boundaries (or the boundaries of body parts) are detected, the sub-arrays associated with the elemental portions of the viewing surface underlying the detected boundaries are operated in the high-resolution mode. The remaining sub-arrays are preferably operated in the low-resolution mode.

According to this embodiment of the invention, each of the sub-arrays operating in the low resolution or the high resolution mode, i.e. the boundary sub-arrays, includes two portions, namely, a covered portion, underlying a transparency, and an uncovered portion which does not underlie a transparency. The covered portions of the sub-arrays are attenuated in the same manner as the low-resolution sub-arrays underlying transparency-covered elemental portions, preferably in accordance with the opacity of the overlying transparency, as described below. The uncovered portions are attenuated in the same manner as the sub-arrays outside the transparency-covered region, and are preferably attenuated to the average opacity of the transparency covered region, as described below.

The present invention provides, in this preferred embodiment thereof, high-resolution adaptation to any given boundaries of the transparency-covered region. By operating the boundary sub-arrays at two different attenuation levels, one for each side of the boundary, annoying contrast at the edges of transparencies is avoided. Such annoying contrast results from a sharp drop in opacity which occurs at the edge of a transparency. The present invention provides high resolution compensation for this annoying contrast.

In an alternative, preferred, embodiment of this aspect of the invention, some of the sub-arrays associated with elemental portions which are not covered by the transparencies, in addition to the boundary regions described above, are also operated in the high resolution mode. According to this embodiment of the invention, the sub-arrays in the high resolution mode are used for displaying information alongside the transparencies. The information, preferably relating to the transparencies in view, is preferably displayed using alphanumeric characters. Alternatively or additionally this information may include electronic images produced by imaging modalities such as CT, NMR or ultrasound.

The displayed information is preferably generated by a microprocessor and may be based on an electronic input received by the microprocessor. In one realization of the invention, the electronic input is provided by optical sensors located at preselected loci on the viewing surface. Preferably, according to this realization of the invention, the optical sensors are operative to scan bar-coded information registered on the transparencies, and to generate electric signals to the microprocessor based on the bar-coded information. The bar-coded information can also be picked-up from the transparencies using external, manually operated, bar-code readers.

Alternatively, the information can be registered on magnetic material at a preselected location on the transparency and read by a magnetic head. In a second realization of this preferred embodiment of the invention, the displayed information is alternatively or additionally based on inputs received from external sources other than the viewed transparencies such as, for example, information generated by a personal computer. The displayed information may include information concerning the transparencies in view or the patient such as, for example, names of patients, parts of body viewed, treatment given to the patient, medical history of the patient, and/or electronic images and so on.

In another, preferred, embodiment of this aspect of the invention, the viewing apparatus can be operated in a "region-of-interest" (ROI) mode, in which the person observing the transparency defines a desired region of interest to be emphasized on the viewing surface. According to this embodiment of the invention, the sub-arrays associated with elemental portions inside the region of interest are all operated in the low-resolution mode. However, some of the sub-arrays associated with elemental portions outside the ROI are preferably operated in a high resolution mode. The sub-arrays operating at the high resolution mode may be used for displaying information as described above.

In accordance with one variation of this embodiment, the sub-arrays underlying the boundaries of the ROI are preferably operated in the high resolution mode, as described above, regarding the boundaries of the transparency-covered regions, thereby defining more exact boundaries for the ROI. The viewing apparatus preferably includes a touch-screen mapping function, which enables the user to define a ROI by indicating an outline of the ROI on the screen using a finger or a pointing instrument.

The ROI can also be determined by automatic scanning.

According to a second aspect of the present invention, there is provided a work station including a user interface and a display apparatus. The display apparatus preferably includes a transparency viewing unit and a data display unit. In a preferred embodiment of this aspect of the invention, the transparency viewing unit is preferably a transparency viewing apparatus such as those described above in accordance with the first aspect of the invention, or any other transparency viewing device as known in the art.

In accordance with one embodiment of this second aspect of the invention, the transparency viewing unit and the data display unit are combined in one display device. Such display apparatus preferably includes an LCA, as in the transparency viewing apparatus of the first aspect of the invention, underlying a viewing surface as described therein. But, contrary to the first aspect of the invention, a preselected portion of the LCA includes only sub-arrays which operate exclusively in a high resolution mode.

According to this embodiment of the invention, the dimensions of the viewing surface are larger than those of a standard viewing apparatus, which are generally multiples of standard transparency dimensions. Therefore, a preselected section of the viewing surface is always left uncovered, even when the viewing surface is overlaid by transparencies to its full capacity. Thus, the LC sub-arrays associated with the sections of the viewing surface not associated with images are reserved, exclusively, for displaying information in the high resolution mode. As described above, this information may include any information, preferably information related to the viewed transparency and the patient.

In accordance with another embodiment of this aspect of the present invention, the data display unit and the transparency viewing unit are parts of an integral unit; however, different display technologies are used for the different units. The viewing unit is preferably one of the embodiments of the transparency viewing apparatus described above. The data display unit may include any display means known in the art such as, for example, a TV or VGA screen, a liquid crystal display (LCD) or a light emitting diode (LED) display.

In a preferred embodiment of the invention, the user interface includes a keyboard and, additionally or alternatively, a command "mouse". Using the keyboard, or mouse, the user can control different functions of the display unit as well as the information displayed by the display unit. The keyboard, or mouse, may be also used to control the operation of the transparency viewing unit, particularly its LCA, and to select different working modes for the viewing apparatus, for example a region-of-interest mode.

In a preferred embodiment of the invention, the display apparatus further includes a film digitizer. The film digitizer preferably includes an optical scanner operative to scan a transparency which is displayed on the viewing surface and to convert the visual content of the transparency into appropriate digital codes. These codes may then be fed into a computer and, after appropriate processing, displayed as an image on a screen, preferably a high resolution monitor, which is preferably included in the data display unit. This processing can also give the boundaries of the ROIs.

In a further, preferred, embodiment of the invention, the viewing apparatus includes a high resolution monitor for displaying digital images produced by medical imaging apparatus, such as a CT or NMR scanner, a gamma camera or an ultrasound mapping device, which are connected through appropriate hardware to a high resolution monitor of the data display unit. The display of these optional devices is preferably controlled through the user interface of the display apparatus.

BRIEF DESCRIPTION OF THE DRAWINGS

The present invention will be better understood from the detailed description of preferred embodiments of the invention, taken in conjunction with the following drawings, of which:

FIG. 2A is a schematic illustration of a liquid crystal array (LCA) useful for the operation of the viewing apparatus of FIG. 1;

FIG. 2B is an enlarged section of FIG. 2A, taken along curve I—I;

DETAILED DESCRIPTION OF A PREFERRED EMBODIMENT

Figure 1A:
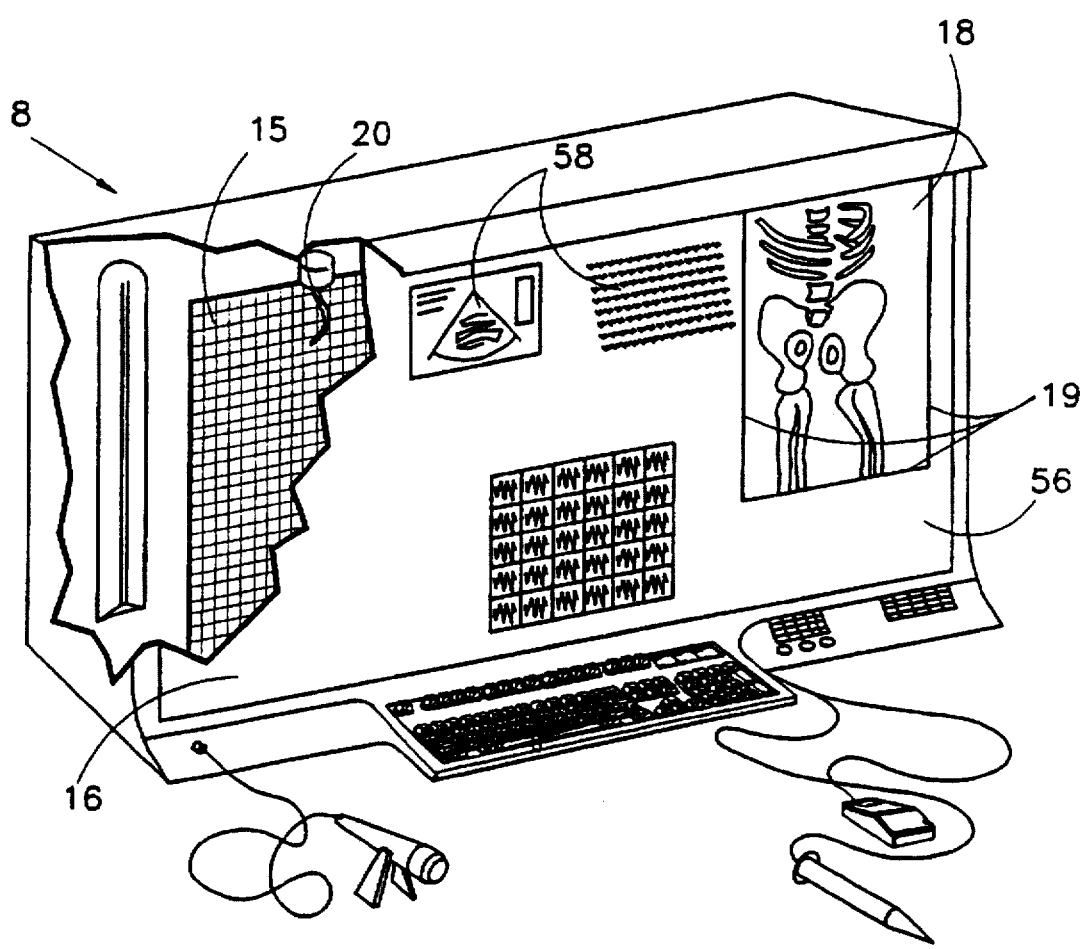
FIG. 1A, is a schematic illustration of a viewing apparatus constructed and operative in accordance with a preferred embodiment of the present invention.
Figure 1B:
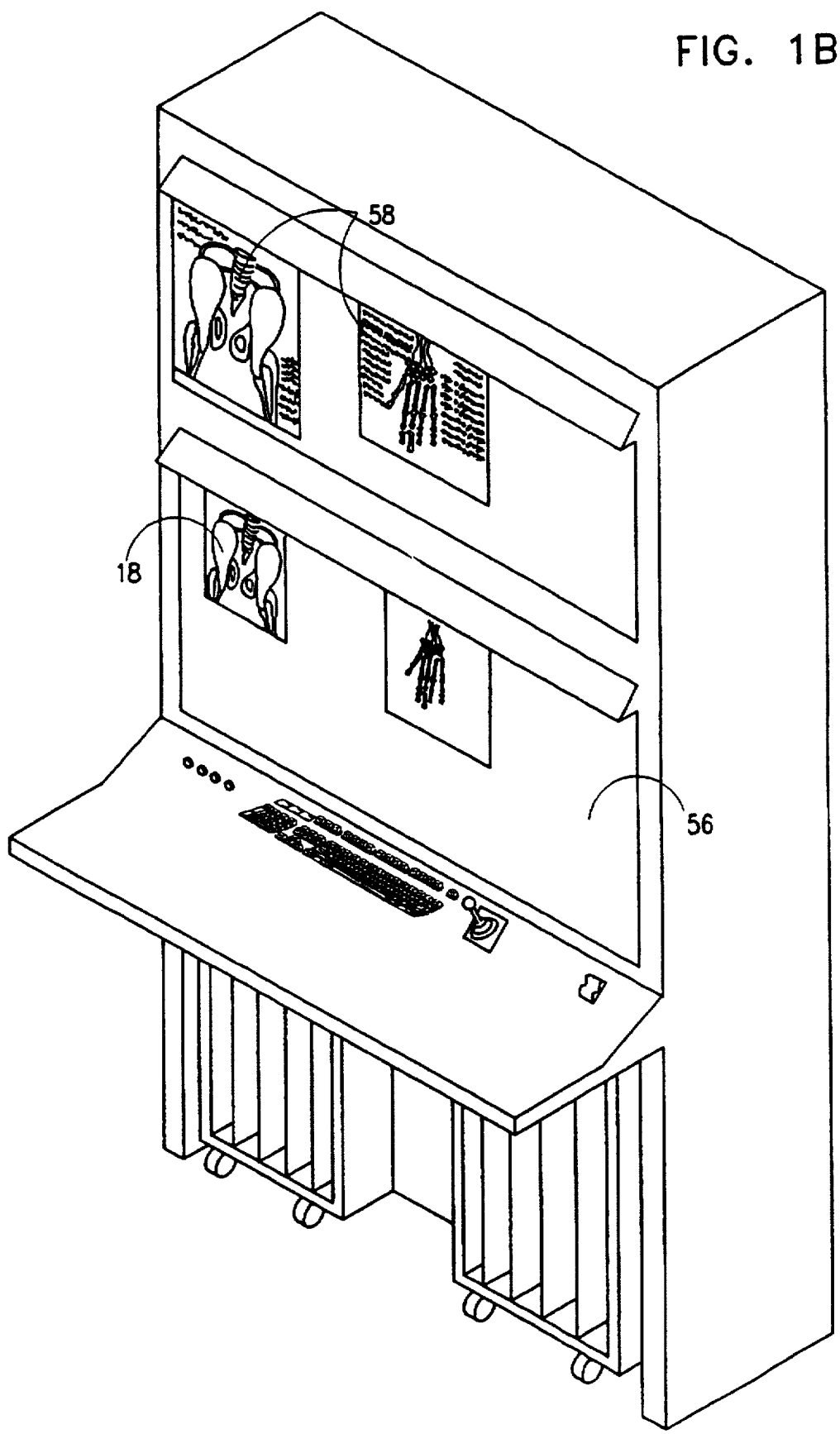
FIG. 1B, is a schematic illustration of another embodiment of a viewing apparatus constructed and operative in accordance with a preferred embodiment of the present invention.
Figure 1C:
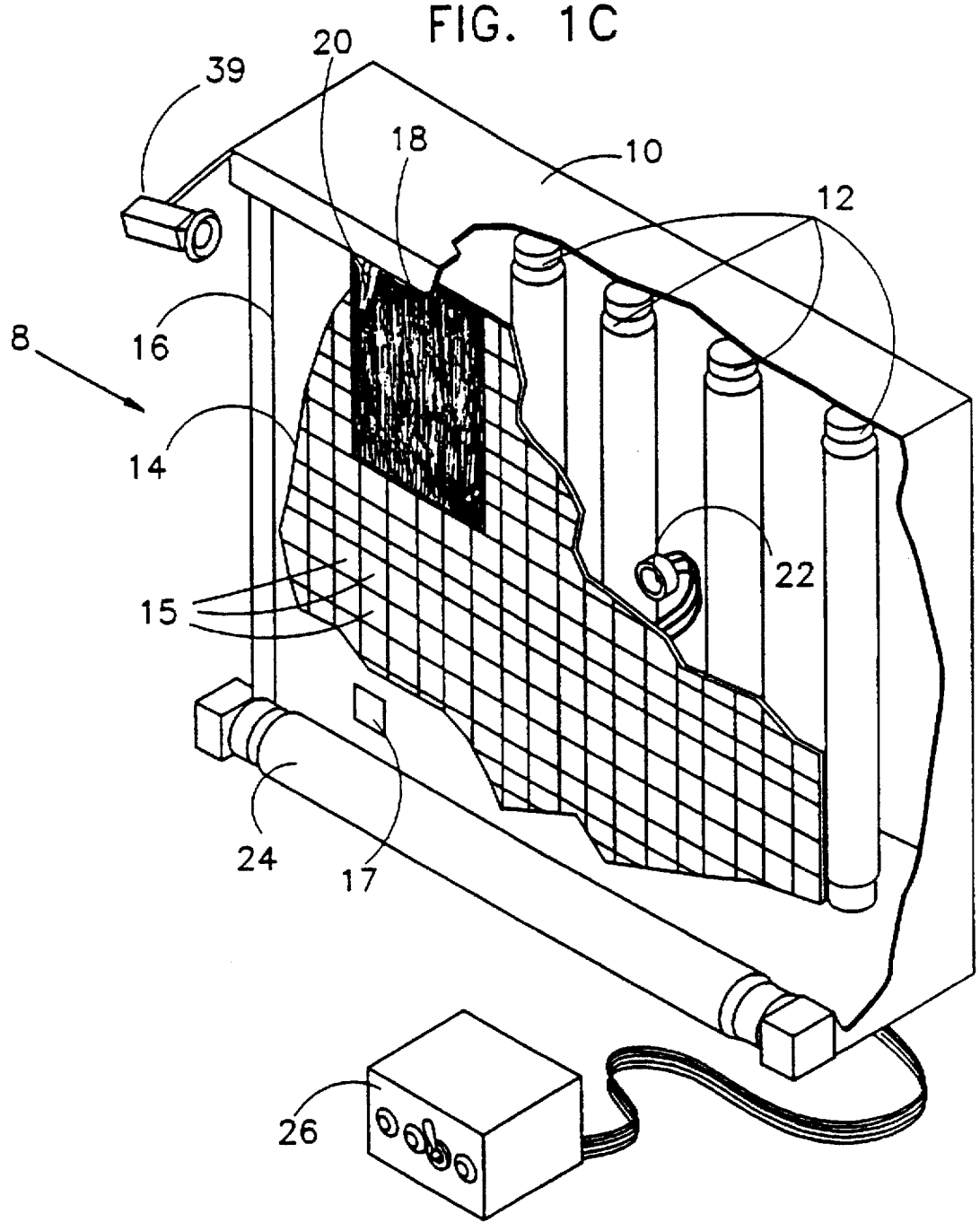
FIG. 1C shows additional details associated with the embodiments of FIGS. 1A and 1B.

FIGS. 1A, 1B and 1C show three different configurations of a viewing device 8 commonly known as a "light box", for viewing transparencies in accordance with a preferred embodiment of the present invention. Reference is also made to FIG. 1C which shows some additional details of the embodiments of FIG. 1 A. Light box 8 preferably includes a housing 10, defining five sides of a rectangular box and preferably made of a light opaque material. Placed within light box 8 is a battery of light sources 12 such as, for example, a row of fluorescent light tubes. An array 14 of elements 15 having independently controllable opacity, for example a liquid crystal array (LCA), i.e. an array of liquid crystal elements, covers the sixth side of light box 8. LCA 14 is preferably overlaid by a transparent material forming a viewing surface 16. A transparency 18 is shown mounted on the viewing surface and is held in place by a film holder 20. In FIG. 1A, elements 15 are illustrated as having a relatively large size, for clarity. In general, the size of elements 15 is small compared to the size of transparency 18, but should not be too small. Typically, elements 15 are squares of at least 2 mm by 2 mm.

Alternatively, viewing surface 16 is the outer surface of LCA 14. Similarly, LCA 14 may be made of a diffusing LCA material or a diffusing material may underlie LCA 14. Placed within viewing device 8, and underlying (i.e. interior to) LCA 14 are one or more photodetectors 22, for sensing light passing through viewing surface 16 and LCA 14.

The layered sequence including LCA 14 and viewing surface 16 on which transparencies 18 are mounted on surface 16, will be hereinafter referred to as a viewing area. For illustrative purposes, the viewing area is envisioned as including a plurality of elemental portions 17, wherein each elemental portion 17 covers precisely one element 15 of LCA 14.

Outside housing 10 and preferably near the bottom of viewing surface 16 is an additional light source 24, such as a fluorescent light. Additionally or alternatively, a light source (not shown) is placed near the top of housing 10. Alternatively, external light sources are not present as part of the viewing device and ambient room lighting is the exclusive external source of light.

As in the above mentioned PCT publications WO 91/10152 and WO 93/01564, the disclosures of which are incorporated herein by reference, LCA 14 of the present apparatus is utilized for controlling the opacity of the viewing area. By changing the light attenuation level of elements 15 in array 14, different illumination levels are obtained for different portions of the viewing area. In a preferred embodiment of the invention, the opacity of elements 15 underlying portions of viewing surface 16 not covered by transparencies 18 is set to zero or, preferably, to a non-zero value dependent on the opacity of transparencies 18. More preferably, the non-zero value is equal to the average opacity of transparencies 18. Thus, in a preferred embodiment, the average illumination through portions of the viewing area outside transparencies 18 is equal to the average illumination through transparency-bearing portions of the viewing area.

In a preferred embodiment of the invention, the opacity of a each element 15 underlying transparency 18 is adjusted, in accordance with the average illumination through the respective elemental portion 17, such that the average illumination through any of elemental portions 17 is substantially the same. This adjustment, suggested in the '152 application, reduces the contrast of the viewing area by compensating for relatively dark and bright areas of transparencies 18. The loci of transparencies 18 and/or the relative opacity of portions of transparencies 18 may be measured off-line, as in WO 91/10152, or determined automatically while transparencies 18 are mounted on viewing surface 16, as described in WO 93/01564. In the latter case, device 8 is provided with a mapping apparatus (not shown in FIG. 1A) which, when operating in an opacity determination mode, determines the precise coverage of transparencies 18 and, preferably, the relative opacity of different portions of transparencies 18.

The results of the mapping procedure or the off-line measurement, depending on the type of system used, are preferably generated as an array of electrical signals to LCA control electronics 26 which, generally speaking, controls the operation of elements 15 in LCA 14. Control electronics 26 also receives other inputs, in accordance with preferred embodiments of the present invention, as described in detail hereinbelow.

FIG. 1B shows an alternative embodiment of a work station according to the invention in which a transportable film device is associated with an electronic display. This device is similar to that of FIG. 1A, except that the films are transported to the work station from a magazine which store many films as is well known in the art. The viewing surface of the transportable film device may be an LCD array as in the device of FIG. 1A. Preferably, the density of the film is read as the film is transported to the viewing surface as described in PCT publication WO 91/10152, the disclosure of which is incorporated herein by reference and the brightness of various elements of the LCD array is set in accordance with these density measurements.

As described below the surface of the LCA may be divided into a data portion 58 and a transparency display portion 56. These portions may be part of the same LCA or may be separate LCAs laid side by side.

In the work station of FIG. 1B the upper portion corresponds to data portion 58 and is used to display information and or images which correspond to the films displayed on the lower (transparency display) portion 56 of the viewing surface. In a preferred embodiment of the invention a bar code on the film identifies the film. Preferably, this bar code is read by a bar code reader during the film's transportation to the viewing surface or after it arrives at the viewing surface, as described below, in detail with respect to FIG. 5.

Reference is now made also to FIG. 2A which is a schematic illustration of LCA 14, and to FIG. 2B which illustrates an expanded section of the LCA of FIG. 2A, taken along curve I—I. In a preferred embodiment of the invention, as can be most clearly seen in FIG. 2B, each element 15 of array 14 is a sub-array including a plurality of small LC elements 28 (preferably 0.1 mm×0.1 mm each, more typically 0.3 mm×0.3 mm). According to the addressing scheme of the present invention, each row 27 and each column 29 of each sub-array 15 is directly connected, through appropriate conductors 25, to an individual driver element (not shown) in control electronics 26. This arrangement, commonly referred to as "matrix addressing", enables high resolution operation of sub-arrays 15, in which the individual LC elements 28 are separately addressable, using their row-column (27, 29) addresses in sub-array 15, by control electronics 26.

In accordance with a preferred embodiment of the present invention, each sub-array 15 of LCA 14 can be operated in either of two modes of operation. According to a first mode, namely, a high resolution mode, each row 27 and each column 29 in a given sub-array 15 are separately addressed, by control electronics 26, thereby providing high resolution matrix addressing of LC elements 28 as described above. According to a second mode, namely, a low resolution, high contrast, mode, all of rows 27 and all of columns 29 in the given sub-array 15 are collectively addressed by control electronics 26.

It should be appreciated that the opacity of each sub-array 15 operated in the low resolution mode is uniform over the area thereof, while the opacity of each sub-array 15 operating in the high resolution mode is, generally, not uniform over its area. In a preferred embodiment, the opacity distribution across each high resolution sub-array 15 is controlled, based on inputs which will be described below, by control electronics 26.

In a preferred embodiment of the invention, control electronics 26 includes an array of driver elements (not shown), preferably MOS logic transistors, wherein each driver element addresses one row 27 or one column 29 of one sub-array 15. The driver elements are preferably arranged in sub-groups, wherein each such sub-group addresses one sub-array 15 of LCA 14. Thus, when a given driver sub-group addresses in accordance with the low resolution mode, all the drivers in the sub-group have equal output levels. In contrast, when the given sub-group addresses in the high resolution mode, individual drivers in the sub-group may have different output levels.

In general the use of matrix addressing reduces the contrast of the LCA. Since all of the elements cannot be individually addressed at the same time, time multiplexing must be used such that each element is addressed only during part of an addressing cycle, whose overall length is limited by the flicker frequency of the display and voltage cross-talk.

In an alternative preferred embodiment of the invention, a better contrast can be achieved and a lesser number of drivers can be used for driving the elements in the arrays and sub-arrays. In this embodiment, elements and sub-arrays of the LCA are grouped by desired opacity. An adaptive addressing system is used to switch groups of elements to the same driver. In general such grouping is possible for groups which do not overlap in either x or y or for groups which have exactly the same extent in one direction or, in other words, have an orthogonal consistency. Orthogonal consistency exists for array arrangements consisting of one or more rectangular regions which are all addressed by the same set of rows or the same set of columns.

This method of grouping has two major effects. First, it allows for a marked reduction in the number of required drivers, especially in a system for viewing transparencies where the number of size combinations of transparencies and ROIs is very limited as compared to the number of combinations of array elements. Second, since the drive allotted to each grouping of elements (and thus the contrast of the display) is directly related to the number of different combinations which must be addressed, the grouping of elements increases the excitation time allotted to each group, thereby increasing the achievable contrast.

Since the transparencies are made up of mainly rectangular portions, most of which are quite large, the prospective savings in drivers and the increase in contrast is significant.

Reference is again made to FIGS. 1A and 1C. As mentioned above, control electronics 26 receives, from optical detectors 22 or from an external CCD camera 39, inputs responsive to the opacity distribution throughout the viewing area. Based on the inputs from optical detector 22 or the CCD camera, control electronics 26 detects the boundaries 19 (i.e. the edges) of the region of surface 16 which is covered by transparencies 18, i.e. the transparency-covered region or by the portion of the transparency which contains an image. Boundaries 19, which are characterized by a sharp drop in the opacity of the viewing area, are preferably detected as sharp changes in the output of optical detector 22. Based on this criterion, control electronics 26 determines which elemental portions 17 of the viewing area are associated with boundaries 19. Alternatively, a CCD camera views the viewing surface from outside the housing and determines the boundaries and or density of the films on the viewing surface. These and other methods of acquiring information regarding the transparencies which are mounted on the viewing surface are described in detail in the above referenced WO 91/10152 and in WO 93/01564, the disclosure of which is incorporated herein by reference.

Sub-arrays 15 associated with the elemental portions 17 underlying boundary 19 will be hereinafter referred to as boundary sub-arrays (BSA). Similarly, sub-arrays 15 associated with elemental portions within boundaries 19 will be referred to as transparency sub-arrays (TSA) and the remaining sub-arrays, associated with elemental portions 17 outside boundary 19, will be referred to as no-transparency sub-arrays (NSA).

It is a feature of an embodiment of the present invention that some of sub-arrays 15 are operated in a low resolution mode, while other sub-arrays 15 are operated in a high resolution mode. Preferably, the boundary sub-arrays 15 are operated in a high-resolution mode while the remaining sub-arrays 15, i.e. the TSAs and NSAs, are operated in a low resolution mode.

Normally, each BSA 15 includes two components, namely, a transparency-covered component (TCC) and an no-transparency component (NTC). In accordance with a preferred embodiment of the invention, TCC and NTC are operated as if they were two separate sub-arrays 15 and, therefore, each component can be attenuated to a different opacity. Thus, the non-transparency side of boundaries 19 may be attenuated to a much higher opacity than the transparency side of boundaries 19, thereby substantially reducing the annoying contrast which otherwise appears at boundaries 19 of transparencies 18.

It is appreciated that in the extremely rare case, wherein a segment of boundaries 19 falls exactly on a boarder between two elemental portions 17, the boundary segment is defined at the borderline between the two elemental portions. In such cases, the two sub-arrays 15 associated with the above mentioned elemental portions are attenuated, independently, in the low resolution mode, while still yielding the desired separation between the two sides of boundaries 19, as described above with reference to TCC and NTC.

Figure 3:
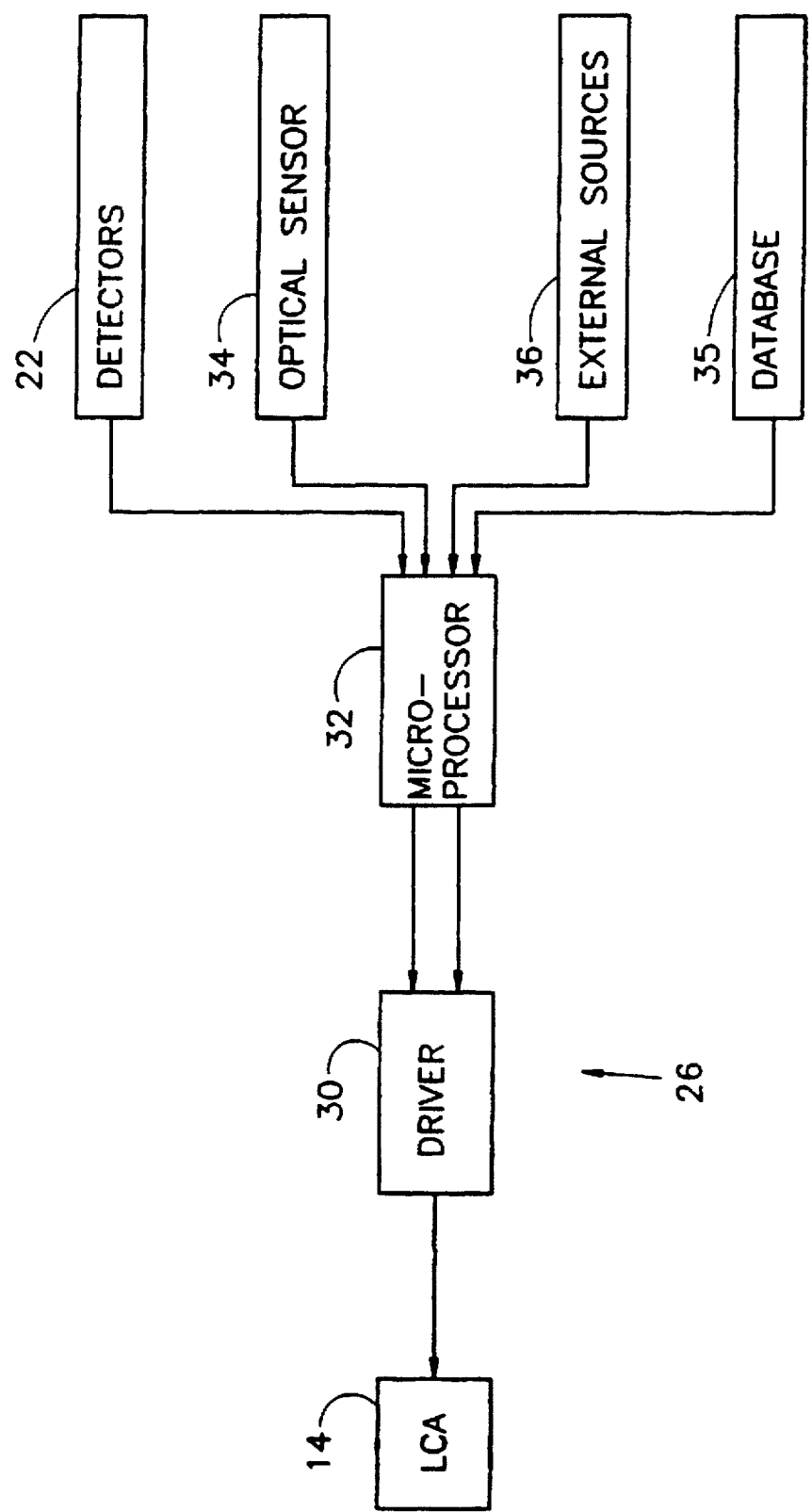
FIG. 3 is a block diagram of the electronics used for the operation of the viewing apparatus of FIG. 1.

Reference is now made also to FIG. 3, which is a block diagram of the electronics used by the viewing apparatus of the present invention, in accordance with a preferred embodiment thereof. As can be seen in FIG. 3, control electronics 26 includes an LCA driving unit 30. Driving unit 30 includes a plurality of LC drivers (not shown), preferably MOS logic transistors, for driving LCA 14 as described above. The outputs of the individual drivers in unit 30 are preferably controlled by a microprocessor 32. Microprocessor 32 preferably receives inputs from photodetectors 22 or the external CCD, as described above with reference to FIG. 1, from an optical sensor 34 and, in a particularly preferred embodiment, from an external information source 36. The functions of optical sensor 34 and external information source 36 are described below.

Based on the inputs from photodetectors 22, microprocessor 32 identifies which of sub arrays 15 underlie boundaries 19 of transparencies 18. Microprocessor 32 then sends appropriate commands to driving unit 30, such that all of the driver sub-groups in unit 30 associated with boundary sub-arrays (BSAs) of LCA 14 are operated in accordance with the high-resolution mode. The remaining driver sub-groups in unit 30 are preferably operated in the low resolution mode as described above. Thus, any sub-array other than a BSA, i.e. a transparency sub-array (TSA) or a no-transparency sub-arrays (NSA), is attenuated to a uniform opacity level. The uniform opacity level of a given TSA or NSA is preferably selected, in accordance with the average illumination through the elemental portions 17 associated with the given sub-array, such that the average contrast between the illuminated transparency and the portion of the LCA surrounding the transparency is minimized to increase the contrast discernibility.

In an alternative, preferred, embodiment of the invention, a selected set of sub-arrays 15 other than the BSAs, i.e. NSAs or TSAs, are operated in the high resolution mode. The selected sub-arrays are operated, by the drivers of driving unit 30, in accordance with appropriate commands generated from microprocessor 32, as will be described below. The set of NSAs and/or TSAs operated in the high resolution mode may be preselected or, alternatively or additionally, selected by the user of the viewing apparatus. In this preferred embodiment, as in the previous embodiment, the BSAs are also preferably operated in the high resolution mode.

It is a feature of some aspects of this embodiment of the present invention that information other than the viewed transparency is displayed on viewing surface 16. In a preferred embodiment of the present invention, sub-arrays 15 operating in the high resolution mode are utilized to display this additional information. In one embodiment of the invention, bar-coded information is optically registered on preselected sections of transparency 18. The bar-coded information is read by optical sensor 34 which preferably includes optical scanner-heads (not shown) located at preselected locations near surface 16. The locations of the scanners are chosen such that, when standard size transparencies are placed in a preselected manner on surface 16, the loci of the scanners will coincide with the preselected bar-code sections on the transparencies.

The bar-coded information, which preferably includes information relating to the transparencies in view, is translated, by optical sensor 34, to electric signals and transferred to microprocessor 32. Microprocessor 32 then sends queries to a database 35 which generates required patient information for display. This information is transmitted by database 35 to microprocessor 32 which sends corresponding information-bearing signals via driver system 30 to some of the sub-arrays 15 operated in the high resolution mode. Consequently, the desired patient information is displayed on part of viewing area 16. The information is preferably displayed in alpha-numeric character form. Alternatively or additionally electronic images associated with the patient are displayed.

In an alternative embodiment of the present invention, optical sensor 34 includes a manual bar-code reader (not shown), such as a light-pen. According to this embodiment of the invention, the bar-coded information registered on the transparencies is read by manual scanning of the bar-codes using the bar-code reader. The bar codes are preferably read off the transparencies while they are being displayed on viewing surface 16. Alternatively, the bar-codes reader can be read from the transparencies before they are mounted.

Reference is again made to FIG. 3. In a preferred embodiment of the present invention, microprocessor 32 receives informative inputs from external information source 36. Such information may include, for example, information relating to medical data on the patient whose X-ray transparencies are being analyzed. External information source 36 preferably includes a personal computer (not shown) having the desired information stored in its memory. The information is interpreted by microprocessor 32 and generated, by virtue of preselected driver groups in unit 30, to preselected, respective, sub-arrays 15 operating in the high resolution mode. These high resolution sub-arrays provide appropriate display of the information, preferably including alpha-numeric text, graphic representations, etc. In a preferred embodiment of the invention database 35 is part of external source 36.

In a preferred embodiment of the present invention, the viewing apparatus can also be operated in a "region-of-interest" (ROI) mode of operation. As described in the above mentioned application WO 93/01564, the touch-screen mapping function of LCA 14 can be utilized by the user to define a "region-of-interest" (ROI), on viewing surface 16, by touching the screen with a finger or a specialized pointing instrument. The outline of the defined ROI is detected, for example, by photodetectors 22, which sense a increase in opacity along the outline of the ROI. The sensed outline is communicated to microprocessor 32. According to this embodiment of the present invention, the sub-arrays 15 associated with elemental portions 17 along the outline of the ROI are operated, by respective driver groups in driving unit 30, in the high-resolution mode. Sub-arrays 15 within the ROI are preferably operated in the low resolution mode. Sub-arrays 15 outside the ROI may be operated in either a high resolution mode, for displaying additional information as described above, or in a high resolution mode, providing a uniform background of preselected opacity to the ROI. Alternatively, transparency-covered sub-arrays (TSAs) outside the ROI are operated mostly in a low-resolution mode, in which case the ROI is emphasized by other means, for example by enhancing the average illumination of the ROI compared to the remainder of the viewing area, as described in the above-mentioned application '564.

Figure 4:
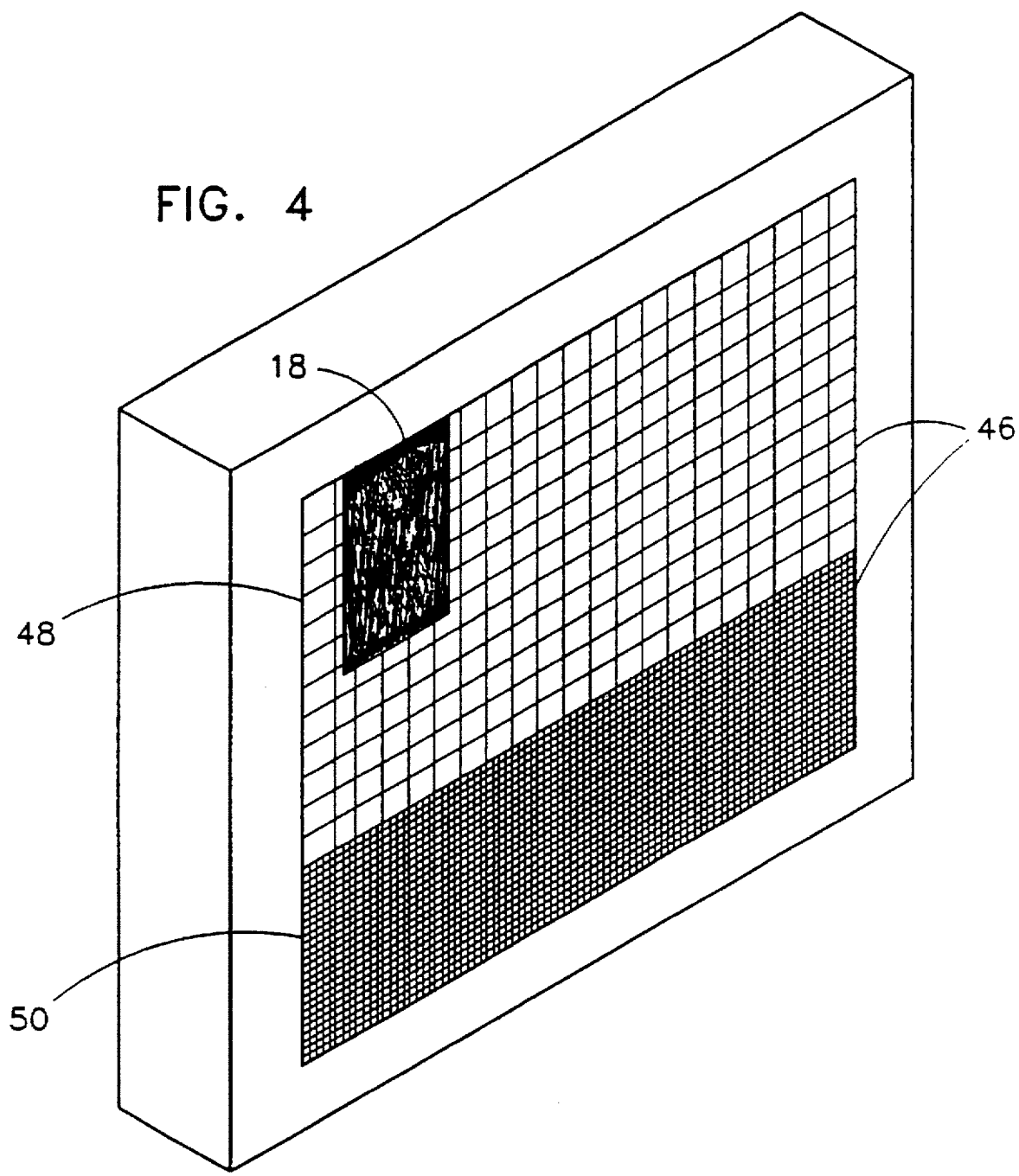
FIG. 4 is a schematic illustration of a viewing apparatus, constructed and operative in accordance with another, preferred, embodiment of the present invention.

Reference is now made to FIG. 4, which illustrates a viewing apparatus in accordance with another preferred embodiment of the present invention. As can be seen in FIG. 4, a viewing area 46 is divided into regions 48 and 50. The dimensions of region 48 are preferably standard light-box dimensions, i.e integer multiples of standard transparency sizes. The area of region 50, which is typically much smaller than that of region 48, may be chosen arbitrarily. Viewing area 46 overlies a liquid crystal array (LCA) similar to LCA 14 of FIG. 1A and 1C, including separately addressable sub-arrays.

In accordance with one realization of this embodiment of the present invention, sub-arrays underlying region 48 are selectively operated in the high-resolution or low resolution modes as defined above, while sub-arrays underlying region 50 are operated exclusively in the high resolution mode defined above. Alternatively, region 48 may be operated as described in Israel Application 107782 titled "Improved Display Device" filed Nov. 28, 1993, which is also filed concurrently under the PCT on the same date as the present application. The disclosure of the PCT application is incorporated herein by reference. Thus, region 48 is reserved exclusively for viewing transparencies 18, while region 50 is reserved exclusively for displaying high-resolution information, preferably in alphanumeric form. It is a feature of this, preferred, embodiment of the invention that high-resolution display is always provided, by region 50, even when region 48 is covered with transparencies to its full capacity.

In an alternative realization of this embodiment of the invention, region 48 is operated exclusively in the low resolution mode, or may include only low-resolution LC elements as described in the '162 and '564 applications.

Figure 5:
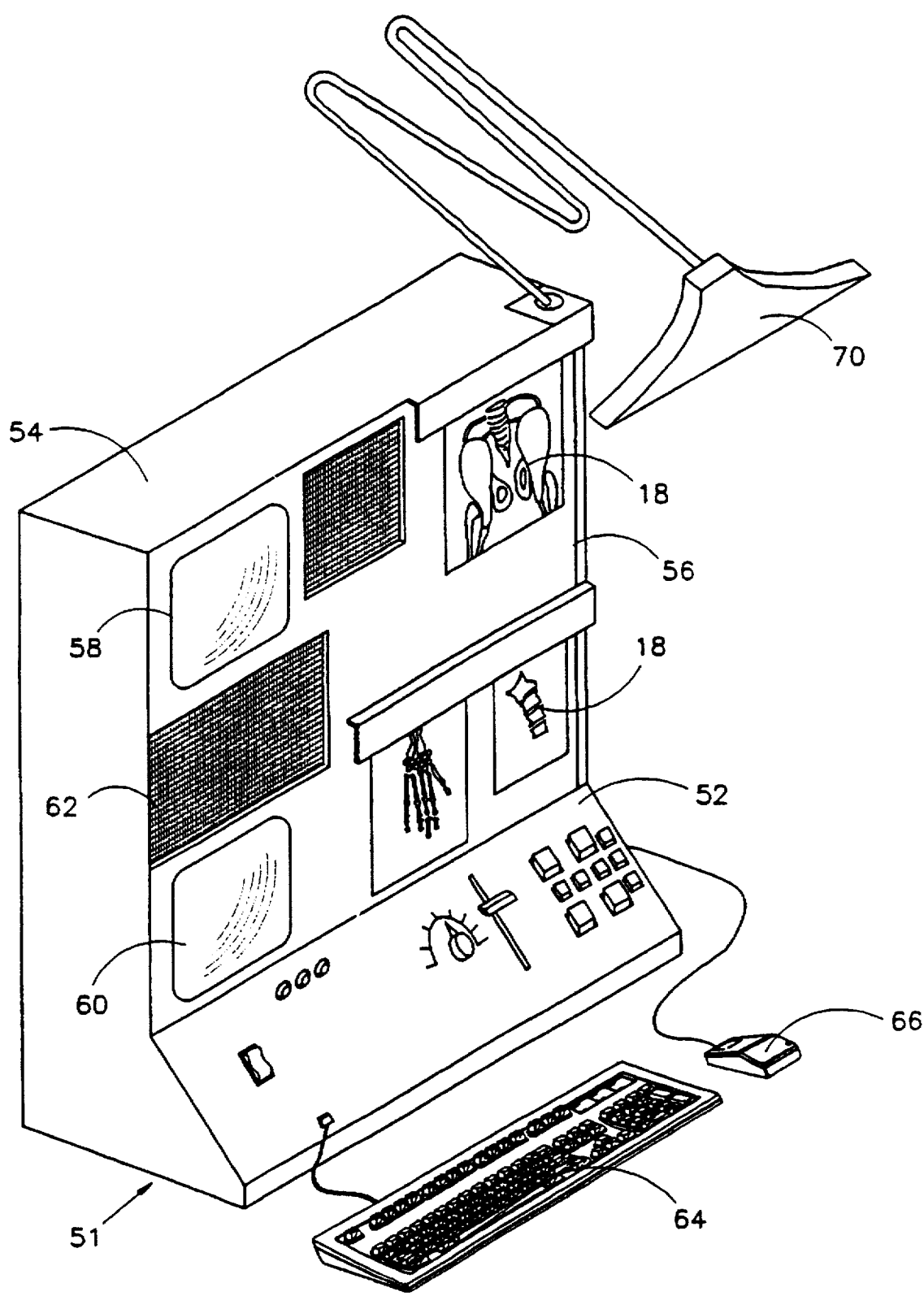
FIG. 5 is a schematic illustration of a work station, including a user interface and a display apparatus, constructed and operative in accordance with another, preferred, embodiment of the present invention.

Reference is now made to FIG. 5, which schematically illustrates a work station 51, including a user interface 52 and a display apparatus 54, constructed and operative in accordance with one, preferred, embodiment of the present invention. As can be seen in FIG. 5, display apparatus 54 preferably includes a transparency viewing unit 56 and a data display unit 58. In a preferred embodiment of the invention, transparency viewing unit 56 is one of the transparency viewing apparatus described above, with reference to FIGS. 1–4, but any other transparency viewing device known in the art may be equally suitable, for example, that shown in the above referenced Israel Application and the associated PCT application.

According to one embodiment of the invention, transparency viewing unit 56 and data display unit 58 are integrally combined in a single viewing surface (not as shown in FIG. 5). According to this embodiment, display apparatus 54 includes an LCA and a viewing surface as described above with reference to the transparency viewing apparatus of FIG. 4. A preselected portion of the LCA (such as portion 50 of FIG. 4) may include only sub-arrays which operate exclusively in a high resolution-mode.

Preferably, as in the apparatus of FIG. 4, the dimensions of the viewing surface of display apparatus 54 are not integer multiples of standard transparency dimensions. Therefore, a preselected section of the LCA can be used, exclusively, for displaying information in the high resolution mode.

In accordance with another, preferred, embodiment of the present invention, as shown in FIG. 5, data display unit 58 and transparency viewing unit 56 are integrally mounted side-by-side units which allow for transparencies to be conveniently viewed with other displayed information or images. Both units are preferably controlled by the same user interface 52. As can be generally seen in FIG. 5, the different components of work station 51 are preferably integrated into a single multi-component apparatus.

According to this preferred embodiment of the invention, viewing unit 56 is preferably one component of the transparency viewing apparatus described above with reference to FIG. 1–3. Data display unit 58 may include any display means known in the art such as, for example, a TV or VGA screen 60 or, additionally or alternatively, a liquid crystal (LC) or a light emitting diode (LED) display 62.

Figure 6:
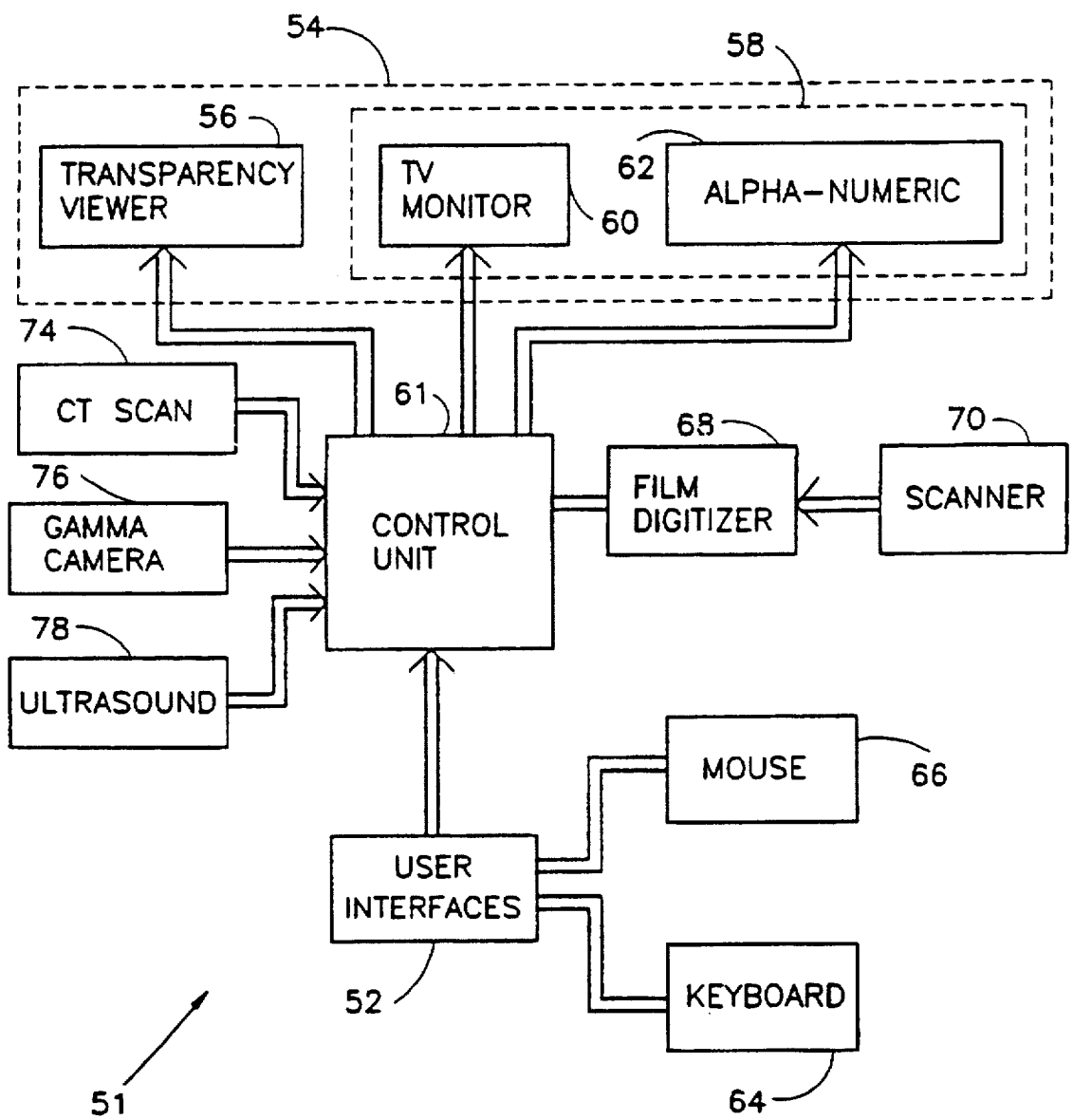
FIG. 6 is a block diagram illustration of the work station of FIG. 5.

Reference is now made also to FIG. 6, which schematically illustrates work-station 51 in electronic block diagram form. In a preferred embodiment of the invention, work station 51 further includes a control unit 61. Control unit 61 is preferably addressed by user interface 52 which preferably includes a keyboard 64 and, additionally or alternatively, a command "mouse" 66. Keyboard 64 and mouse 66 are preferably employed by a user for entering preselected commands into control unit 61. Control unit 61, which may include a microprocessor or a computer, controls the different features of data display unit 58. If one of the embodiments of FIGS. 1–4 is used as viewing unit 56, as is preferably the case, control electronics 26 (FIG. 3) is preferably included in control unit 61. Thus keyboard 64 and/or mouse 66 preferably also control the operation of transparency viewing unit 56, which preferably includes an array such as LCA 14 of FIGS. 1–3.

In a preferred embodiment of the invention, viewing unit 56 is operable in accordance with more than one working mode, as described above with respect to the apparatus of FIGS. 1A and 1C. In this embodiment, the different modes are preferably selectable via keyboard 64 or mouse 66.

In a preferred embodiment of the present invention, work station 51 further includes a film digitizer 68. Film digitizer 68 preferably includes an optical scanner 70 for scanning prints or transparencies and generating a digital output corresponding to the scanned optical information. Preferably, optical scanner 70 is applied directly to a transparency 18 which is displayed on the viewing surface of viewing unit 56. The digital output from scanner 70 is preferably fed into control unit 61 and, upon appropriate commands from keyboard 64, displayed as a digital image on screen 60. As mentioned above, screen 60 is preferably a high resolution monitor included in data display unit 58.

In a further, preferred, embodiment of the invention, data display unit 58 is also used for displaying digital images produced by medical imaging apparatus external to display apparatus 56. According to a preferred embodiment of the invention, the work station includes an interface to a CT or NMR scanner 74, a gamma camera 76, an ultrasound mapping device 78, or any other medical imaging apparatus known in the art or to a database in which digital images are stored. Each of these external apparatus is preferably connected to an appropriate processor in control unit 61. By providing preselected commands from keyboard 64 or mouse 66, the user can view images produced by any of the external apparatus on display unit 58 together with transparencies. Such images may be versions of the transparency being displayed which have been processed to increase visibility of lesions or other abnormalities, as, for example, by spatial filtering. In a preferred embodiment of the invention, the images are viewed on a high resolution monitor of data display unit 58.

In a preferred embodiment of the invention, the displayed image has been processed in accordance with one of the well known methods of computer aided diagnostics. In accordance with this embodiment of the invention, an indication is provided to the reader of the film of those areas of the film which the computer aided diagnostic system has determined are suspect. Such indication may include a pointer formed by the LCA underlying the suspect region, or by flashing the LCA beneath the suspect region.

Since the transparencies have a substantial optical density, in a preferred embodiment of the invention, the region on which the transparency is mounted is backlighted with higher intensity light than those regions which have alphanumeric or digital image data. This may be easily accomplished by using a higher intensity light source behind the transparency portions than behind the data portions of the LCA, for example by providing more or stronger light sources in one region than in the other or by attenuating the light in the data region.

It should be appreciated that the present invention is not limited to what has been thus far described with reference to preferred embodiments of the invention. Rather, the scope of the present invention is limited only by the following claims:

We claim:

1. Viewing apparatus comprising:

a housing;

a transparency viewing apparatus mounted in said housing; and an electronic data display unit mounted in said housing;

a source of backlighting for the transparency viewing apparatus and the electronic display unit, wherein light which backlights said transparency has a higher intensity than light exiting the electronic data display unit.

2. Apparatus according to claim 1 wherein the transparency viewing apparatus and the electronic display unit are mounted side-by-side.

3. Apparatus according to claim 1 wherein said transparency viewing apparatus comprises a backlighted liquid crystal array, LCA, with selectively opacifyable elements.

4. Apparatus according to claim 1 wherein said electronic data display unit comprises a backlighted liquid crystal array, LCA, with selectively opacifyable elements.

5. Apparatus according to claim 3 wherein said electronic data display unit comprises a backlighted liquid crystal array, LCA, with selectively opacifyable elements.

6. Apparatus according to claim 5 wherein said transparency viewing apparatus and said electronic display unit together comprise a LCA.

7. Apparatus according to claim 3 wherein said liquid crystal array comprises:

a plurality of liquid crystal, LC, elements grouped in sub-arrays, whereby each sub-array is separately addressed from the other sub-arrays; and means for operating each of the sub-arrays in either a high resolution mode, in which the LC elements in the sub-array are separately addressed, or in a low-resolution mode, in which all of the LC elements in the sub-array are collectively addressed.

8. Apparatus according to claim 7 wherein sub-arrays which are partly overlaid by a transparency are operated in the high resolution mode.

9. Apparatus according to claim 4 wherein said liquid crystal display comprises:

a plurality of liquid crystal, LC, elements grouped in sub-arrays, whereby each sub-array is separately addressed from the other sub-arrays; and means for operating each of the sub-arrays in either a high resolution mode, in which the LC elements in the sub-array are separately addressed, or in a low-resolution mode, in which all of the LC elements in the sub-array are collectively addressed.

10. Apparatus according to claim 9 wherein all of the sub-arrays in the electronic display unit are exclusively operated in the high-resolution mode.

11. Apparatus according to claim 1 and further comprising means for sensing information registered on a transparency and providing a corresponding input to the electronic display unit operative to display information related to the transparency.

12. Apparatus according to claim 11 wherein the means for sensing comprises an optical sensor operative to read bar-coded information registered on the transparency.

13. Apparatus according to claim 1 wherein the data display unit comprises a light emitting diode, LED, display.

14. Apparatus according to claim 1 wherein the data display unit comprises an image display operative to display electronic images.

15. Apparatus according to claim 14 wherein said image display is also operative to display alphanumeric information.

16. Apparatus according to claim 14 and also including means for receiving images from a memory and for displaying them on said image display.

17. Apparatus according to claim 16 wherein said images are digital medical images.

18. Apparatus according to claim 1 further comprising an external information source operative to generate an informative input to the electronic display unit thereby to display information from said external information source.

19. Apparatus according to claim 1 and further comprising a control unit operative to receive user commands generated from the user interface and to control the information displayed on the electronic display unit in accordance with the received user commands.

20. Apparatus according to claim 1 and further comprising a control unit operative to receive user commands generated from the user interface and to control the operation of said transparency display apparatus in accordance with the received user commands.

21. Apparatus according to claim 19 wherein said control unit is further operative to control the operation of said transparency display apparatus in accordance with received user commands.

22. Apparatus according to claim 19 wherein the user interface includes a keyboard.

23. Apparatus according to claim 19 wherein the user interface includes a control mouse.

24. Viewing apparatus comprising:

a housing;

a transparency viewing apparatus mounted in said housing; and an electronic data display unit mounted in said housing;

a source of backlighting for the transparency viewing apparatus and the electronic display unit, wherein the source of backlighting is arranged such that back illumination of said transparency viewing apparatus is greater than back illumination of the electronic data display unit.

* * * * *